United States Patent
Meyer

(10) Patent No.: US 6,254,509 B1
(45) Date of Patent: Jul. 3, 2001

(54) ENGINE THROTTLE CONTROL FOR IMPROVED SHIFTING

(75) Inventor: Duane Fredrick Meyer, Waterloo, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/451,182

(22) Filed: Nov. 29, 1999

(51) Int. Cl.[7] .................................................. B60K 41/02
(52) U.S. Cl. ............................................. 477/109; 477/111
(58) Field of Search .................................. 477/109, 111, 477/107

(56) References Cited

U.S. PATENT DOCUMENTS

| | | | |
|---|---|---|---|
| 2,656,024 | 10/1953 | Sobie | 192/84 |
| 2,923,387 | 2/1960 | Brown | 192/84 |
| 4,646,891 | 3/1987 | Braun | 192/0.032 |
| 4,724,723 | * 2/1988 | Lockhart et al. | 477/109 X |
| 5,091,854 | * 2/1992 | Yoshimura et al. | 477/109 X |
| 5,184,301 | 2/1993 | Stasell | 364/431.07 |
| 5,184,577 | * 2/1993 | Kato et al. | 477/109 X |
| 5,207,198 | 5/1993 | Eisele | 123/357 |
| 5,316,116 | 5/1994 | Slicker et al. | 477/181 |
| 5,374,224 | 12/1994 | Huffmaster et al. | 477/181 |
| 5,378,211 | 1/1995 | Slicker et al. | 477/175 |
| 5,417,625 | * 5/1995 | Yamaki et al. | 477/109 |
| 5,445,576 | * 8/1995 | Motamedi et al. | 477/109 X |
| 5,501,642 | * 3/1996 | Inuzuka et al. | 477/107 |
| 5,580,331 | * 12/1996 | Shiraishi et al. | 477/109 |
| 5,662,553 | 9/1997 | Reichlinger | 477/179 |
| 5,738,609 | 4/1998 | Jones et al. | 477/175 |
| 5,820,517 | * 10/1998 | Saito et al. | 477/109 |
| 5,827,151 | * 10/1998 | Sawamura et al. | 477/109 |
| 5,890,994 | 4/1999 | Sawamura et al. | 477/181 |
| 5,935,185 | * 8/1999 | Sawamura et al. | 477/109 X |
| 6,023,647 | * 2/2000 | Saito et al. | 477/107 X |
| 6,024,669 | * 2/2000 | Iwatsuki et al. | 477/107 |

* cited by examiner

Primary Examiner—Sherry Estremsky
Assistant Examiner—Ha Ho

(57) ABSTRACT

A vehicle includes a powershift transmission driven by an electronically controlled engine. A control system momentarily modifies a magnitude of an engine throttle command signal during a shift of the power shift transmission in order to make the shift smoother and less sensitive to achieving optimum clutch engagement pressure. It also prevents an engine governor from over-reacting and causing rough shifts.

22 Claims, 1 Drawing Sheet

ENGINE THROTTLE CONTROL FOR IMPROVED SHIFTING

BACKGROUND OF THE INVENTION

The present invention relates to a vehicle powershift transmission and engine control system.

Powershift transmissions change speeds by disengaging one or more clutches and then engaging one or more clutches, with no interruption of power during the shift. Shift smoothness is obtained by modulating the pressure of the oncoming clutches, i.e. engaging them at low pressure. Shift smoothness is very sensitive to having the optimum engagement pressure in relation to the load being transmitted by the transmission. If the engagement pressure is too low, the vehicle may drop load or speed during the shift, if the engagement pressure is too high, the shift will be aggressive, jumpy and harsh. Under lightly loaded conditions, the typical engine governor response contributes to the poor shift. For example, during an upshift, if the engaging clutch locks up quickly, it will bring the engine speed down rapidly. The engine governor typically over-reacts to this drop in speed by quickly increasing fuel to the engine. An excess amount of fuel may then cause the engine to quickly overshoot the commanded speed. The resulting acceleration-deceleration causes the vehicle to pitch fore and aft, and produces a "jumpy" feel.

SUMMARY OF THE INVENTION

Accordingly, an object of this invention is to provide a transmission and engine control system which prevents such engine governor-caused rough shifts.

Accordingly, another object of this invention is to provide a transmission and engine control system which makes shift smoothness less sensitive to modulating the oncoming clutch at the optimum pressure.

These and other objects are achieved by the present invention, wherein a control system for a vehicle is provided. The vehicle includes an engine which drives a powershift transmission. The powershift transmission has a gear box which is operated by a set of pressure operated clutches which are controlled by a corresponding set of solenoid operated shift control valves. The valves are controlled by an electronic vehicle control unit (VCU) in response to the shift command signals generated by an operator controlled shift control lever mechanism. The engine is controlled by an electronic engine control unit (ECU) which receives a throttle command signal from the VCU. During an upshift the control system depressurizes at least one off-going clutch and later pressurizes at least one on-going clutch. The VCU, during a shift, abruptly modifies the magnitude of the throttle command signal while the off-going clutch is being de-pressurized, and then gradually returns the magnitude of the throttle command signal back to its original magnitude when the on-going clutch is fully pressurized. During an upshift, the throttle command signal TC is similarly momentarily decreased at the start of the clutch swap, and is then gradually increased or ramped up. During a downshift, the throttle command signal TC is similarly momentarily increased at the start of the clutch swap, and is then gradually decreased or ramped down. This strategy allows the engine to accomplish most of the change in vehicle speed, and is less dependent on proper slipping of the oncoming clutch. This also causes the engine governor to react properly to the shift, and avoids governor over-reaction.

DESCRIPTION OF THE PREFERRED EMBODIMENT

Figure 1:
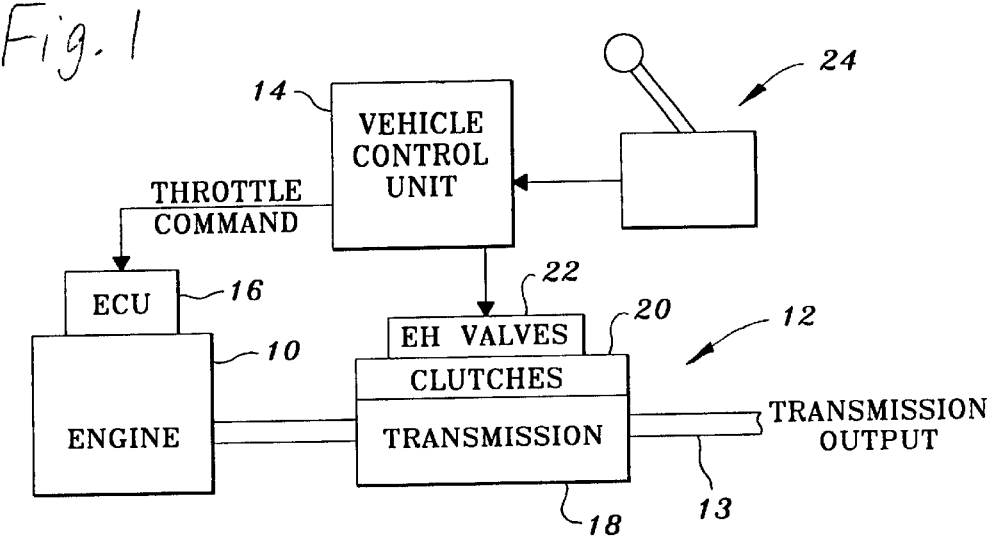
FIG. 1 is a simplified schematic diagram of a vehicle transmission/engine drive and control system of the present invention.

As shown in FIG. 1, a vehicle power train includes an engine 10 which drives a power shift transmission 12, which has an output shaft 13 which is connected to drive wheels (not shown). The power shift transmission 12 includes a transmission or gear box 18 which is operated by a set of pressure operated control elements or clutches 20 which are controlled by a corresponding set of solenoid operated shift control valves 22. The transmission 18 is preferably a powershift transmission such as a production John Deere 16 speed powershift transmission, which is controlled by an electronic vehicle control unit (VCU) 14, or such as described in U.S. Pat. No. 5,011,465, issued Apr. 30, 1991 to Jeffries et al., and assigned to the assignee of this application. The engine 10 is preferably an electronically controlled engine such as a production John Deere 8.1 liter governor controlled Diesel engine, and is controlled by a production electronic engine control unit (ECU) 16 in response to a throttle command signal.

Figure 2:
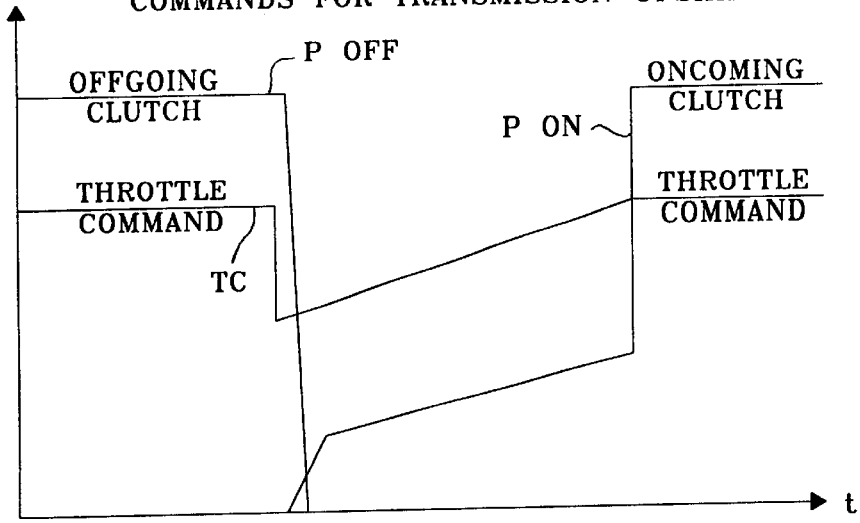
FIGS. 2 is a signal timing diagram illustrating the time behavior of the throttle command signal in relation to the operation of the transmission control clutches.

The VCU 14 sends shift control signals to the shift control valves 22 in response to command signals it receives from an operator controlled shift control lever mechanism 24, such as the shift control mechanism of a production John Deere 8000 Series tractor. For example, FIG. 2 shows the behavior of the pressure (P-OFF) of an off-going clutch and P-ON of an on-going clutch during a typical upshift.

According to the present invention, the VCU 14 controls or modifies the throttle command signal during upshifts and downshifts to improve the quality or smoothness of shifts. As best seen in FIG. 2, the VCU 14 momentarily reduces the magnitude of the throttle command signal during an upshift of the power shift transmission 12. More specifically, during an upshift, the magnitude of the throttle command signal, TC, is abruptly reduced when the pressure of the off-going clutch, P-OFF, is being reduced to zero. Preferably, the throttle command signal TC is reduced to a value which would produce a lower engine speed corresponding to the change in gear ratio resulting from the upshift. Thereafter, the magnitude of the throttle command signal TC is gradually increased as the pressure P-ON of the on-coming clutch is gradually increased, and so that the magnitude of the throttle command signal TC is back up to its original magnitude when the on-going clutch pressure P-ON is at its full on pressure level. Thus, as described above, and as shown in FIG. 2, the throttle command signal is modified in coordination with the changes to the transmission control clutch pressure.

Similarly, although not illustrated, for a downshift, the throttle command signal TC momentarily increased at the start of the clutch swap, and is then gradually decreased or ramped down.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. A control system for a vehicle having a governor controlled engine which drives a power shift transmission, the power shift transmission having a gear box which is operated by a set of pressure operated clutches which are controlled by a corresponding set of solenoid operated shift control valves which are controlled by an electronic vehicle control unit (VCU) in response to the shift command signals generated by an operator controlled shift control lever mechanism, the engine being controlled by an electronic engine control unit (ECU) which receives a throttle command signal from the VCU, comprising:

a throttle command modifier for momentarily modifying a magnitude of the throttle command signal during a shift of the power shift transmission, and during said shift, the throttle command modifier abruptly modifies the magnitude of the throttle command signal from a first magnitude to a second magnitude, and then gradually returns the magnitude of the throttle command signal back to the first magnitude upon completion of said shift.

2. The control system of claim 1, wherein:

the solenoid operated shift control valves operate to vary pressures applied to the pressure operated clutches; and the magnitude of the throttle command signal is momentarily modified in coordination with the variations of said clutch pressure.

3. The control system of claim 1, wherein:

during an upshift of the power shift transmission, the speedy command modifier reduces the magnitude of the speed command signal.

4. The control system of claim 4, wherein:

the speed command modifier momentarily reduces the magnitude of the speed command signal during said upshift.

5. The control system of claim 3, wherein:

during said upshift, the speed command modifier abruptly reduces the magnitude of the speed command signal and then gradually increases the magnitude of the speed command signal back to the first magnitude prior to said upshift.

6. The control system of claim 1, wherein:

during a downshift of the power shift transmission, the speed command modifier increases the magnitude of the speed command signal.

7. The control system of claim 6, wherein:

the speed command modifier momentarily increases the magnitude of the speed command signal during said downshift.

8. The control system of claim 6, wherein:

during said downshift, the speed command modifier abruptly increases the magnitude of the speed command signal and then gradually decreases the magnitude of the speed command signal back to the first magnitude prior to said downshift.

9. The control system of claim 1, wherein:

the speed command signal is modified to a value which produces a modified engine speed corresponding to a change in a gear ratio resulting from the shift.

10. The control system of claim 9, wherein:

during an upshift, the speed command signal is reduced to a value which produces a lower engine speed corresponding to a change in a gear ratio resulting from the upshift.

11. The control system of claim 9, wherein:

during a downshift, the speed command signal is increased to a value which produces a higher engine speed corresponding to a change in a gear ratio resulting from the downshift.

12. In a vehicle having a governor controlled engine which drives a power shift transmission, the power shift transmission having a gear box which is operated by a set of pressure operated clutches which are controlled by a corresponding set of solenoid operated shift control valves which are controlled by an electronic vehicle control unit (VCU) in response to the shift command signals generated by an operator controlled shift control lever mechanism, the engine being controlled by an electronic engine control unit (ECU) which receives a speed command signal from the VCU, a method of improving shift quality comprising:

momentarily modifying a magnitude of the speed command signal during a shift of the power shift transmission; and during said shift, abruptly modifying the magnitude of the speed command signal from a first magnitude to a second magnitude then gradually returning the speed command signal back to said first magnitude upon completion of said shift.

13. The method of claim 12, wherein:

the solenoid operated shift control valves operate to vary pressures applied to the pressure operated clutches; and the magnitude of the speed command signal is momentarily modified in coordination with the variations of said clutch pressure.

14. The method of claim 12, wherein:

during an upshift of the power shift transmission, a speed command modifier reduces the magnitude of the speed command signal.

15. The method of claim 14, wherein:

the magnitude of the speed command signal is momentarily reduced during said upshift.

16. The method of claim 14, wherein:

during said upshift, the magnitude of the speed command signal is abruptly reduced and then gradually increased back to the first magnitude prior to said upshift.

17. The method of claim 12, wherein:

during a downshift of the power shift transmission, the magnitude of the speed command signal is increased.

18. The method of claim 17, wherein:

the magnitude of the speed command signal is momentarily increased during said downshift.

19. The method of claim 17, wherein:

during said downshift, the magnitude of the speed command signal is abruptly increased and then gradually decreased back to the first magnitude prior to said downshift.

20. The method of claim 12, wherein:

the speed command signal is modified to a value which produces a modified engine speed corresponding to a change in a gear ratio resulting from the shift.

21. The method of claim 20, wherein:

during an upshift, the speed command signal is reduced to a value which produces a lower engine speed corresponding to a change in a gear ratio resulting from the upshift.

22. A The method of claim 20, wherein:

during a downshift, the speed command signal is increased to a value which produces a higher engine speed corresponding to a change in a gear ratio resulting from the downshift.

\* \* \* \* \*

UNITED STATES PATENT AND TRADEMARK OFFICE
CERTIFICATE OF CORRECTION

PATENT NO. : 6,254,509 B1
DATED : July 3, 2001
INVENTOR(S) : Duane Fredrick Meyer It is certified that error appears in the above-identified patent and that said Letters Patent is hereby corrected as shown below:

Column 3,
Line 27, delete "speedy" and insert -- speed --.
Line 29, delete "4" and insert -- 3 --.

Signed and Sealed this

Sixteenth Day of July, 2002

Attest:

Attesting Officer

JAMES E. ROGAN
Director of the United States Patent and Trademark Office